United States Patent
Schaude

(10) Patent No.: US 11,474,811 B2
(45) Date of Patent: Oct. 18, 2022

(54) DELETION OF DELIVERED OBJECTS

(71) Applicant: SAP SE, Walldorf (DE)

(72) Inventor: Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 468 days.

(21) Appl. No.: 16/196,001

(22) Filed: Nov. 20, 2018

(65) Prior Publication Data

US 2020/0159523 A1    May 21, 2020

(51) Int. Cl.
| | | |
|---|---|---|
| G06F 8/71 | (2018.01) | |
| G06F 8/60 | (2018.01) | |
| G06F 16/215 | (2019.01) | |
| G06F 16/23 | (2019.01) | |
| G06F 8/75 | (2018.01) | |

(52) U.S. Cl.
CPC .............. *G06F 8/71* (2013.01); *G06F 8/60* (2013.01); *G06F 8/75* (2013.01); *G06F 16/215* (2019.01); *G06F 16/2365* (2019.01)

(58) Field of Classification Search
CPC ...... G06F 8/71; G06F 16/215; G06F 16/2365; G06F 8/60; G06F 8/75
See application file for complete search history.

(56) References Cited

U.S. PATENT DOCUMENTS

| | | | | |
|---|---|---|---|---|
| 8,769,480 B1* | 7/2014 | Wagner | .................... | G06F 16/13 717/101 |
| 2006/0242197 A1* | 10/2006 | Tsyganskiy | ............... | G06F 8/72 |
| 2008/0275968 A1* | 11/2008 | Springholz | ............ | G06Q 10/06 709/220 |
| 2010/0153940 A1* | 6/2010 | Remmel | .................. | G06F 8/72 717/168 |
| 2011/0153559 A1* | 6/2011 | Rangarajan | ........... | G06F 16/235 707/609 |
| 2012/0284231 A1* | 11/2012 | Basescu | ................ | G06F 16/219 707/638 |
| 2017/0060569 A1* | 3/2017 | Piccinini | .................. | G06F 8/656 |
| 2018/0160297 A1* | 6/2018 | Geilfuss | ................ | H04W 4/027 |
| 2019/0138424 A1* | 5/2019 | Vanderwerff | ......... | G06F 11/004 |

* cited by examiner

*Primary Examiner* — Chat C Do
*Assistant Examiner* — Noor Alkhateeb
(74) *Attorney, Agent, or Firm* — Mintz Levin Cohn Ferris Glovsky and Popeo, P.C.

(57) ABSTRACT

Data characterizing an object for deprecation and code characterizing a modification to an application is received at a code development system. The object is for deprecation and the application is deployed on a plurality of tenants of a production database management system. A first application patch is generated according to the received code. The first patch includes computer executable instructions that during deployment to a target system configure the target system to prevent further usage by tenants of the object for deprecation. The first application patch is deployed to the plurality of tenants. A second application patch is generated. The second application patch includes computer executable instructions that during deployment to the target system configure the target system to allow deletion of the object from the target system. The second application patch is deployed to the plurality of tenants. Related apparatus, systems, techniques, and articles are also described.

20 Claims, 4 Drawing Sheets

DELETION OF DELIVERED OBJECTS

TECHNICAL FIELD

The subject matter described herein relates to deleting delivered objects in a multitenant database system.

BACKGROUND

Businesses use a plurality of business process applications and/or services in their business operations. Applications and/or services can be programs that an end-user runs to accomplish certain tasks and can work in conjunction with one or more back-end systems, which can store the data to be worked on, such as, for example, objects and other business data, as well as logic for manipulating the data, such as transactions or other business logic. Examples of back-end systems may include database systems, enterprise resource planning ("ERP") systems, and customer relationship management ("CRM") systems. A user interface ("UI") can be designed to work in concert with application programs, and can facilitate interaction between humans and computers by inviting and responding to user input. In order to accomplish various tasks, a user can initiate various applications, tasks, agents, and the like that may manipulate data in different ways to achieve results desired by the user.

Users can design and/or create various process objects, such as sales orders, invoices, and the like. An object can be created using any known computing systems and languages (e.g., one such exemplary language includes advanced business application programming ("ABAP") high level programming language, which is available from SAP SE, Walldorf, Germany). Such created objects can be stored in memory, such as in a database. An example of such database includes a High-Performance Analytic Appliance ("HANA"), which is a column-oriented, in-memory database appliance available from SAP SE, Walldorf, Germany. Objects can be created at design-time for execution at runtime of an application. To accommodate design-time creation and runtime execution, objects need to be deployed at the database. Deployment of objects can be a complicated process and can involve a multitude of aspects, such as version control, lifecycle management, special programs, application layer artifacts, and others.

In multitenant database systems, some objects can be visible system-wide (e.g., to all tenants). Because all tenants may be utilizing the object, deletion of the object from the system or portion of the object from the system is prevented in order to ensure against loss of data and to ensure system-wide support of all tenants. But by preventing deletion of an object or portion thereof, objects may contain unnecessary and/or unused data. This can hinder efficient implementation of multitenant database systems, management of objects among tenants, and the like.

SUMMARY

In an aspect, data characterizing an object for deprecation and code characterizing a modification to an application is received at a code development system. The object is for deprecation and the application is deployed on a plurality of tenants of a production database management system. A first application patch is generated according to the received code. The first patch includes computer executable instructions that during deployment to a target system configure the target system to prevent further usage by tenants of the object for deprecation. The first application patch is deployed to the plurality of tenants. A second application patch is generated. The second application patch includes computer executable instructions that during deployment to the target system configure the target system to allow deletion of the object from the target system. The second application patch is deployed to the plurality of tenants.

One or more of the following features can be included in any feasible combination. For example, whether the object for deprecation is utilized by the application can be determined. A list indicating locations within the application that the object for deprecation is utilized can be generated according to the received code. The first application patch can include the list indicating locations within the application that the object for deprecation is utilized. A visualization characterizing the determination can be presented to a user. Utilization of the object can be prevented by at least one tenant of the multitenant database system. The object can be deleted from the multitenant database system. The deleting can be by at least one tenant of the multitenant database system. The object can include a data source, a field within the data source, a node, an element of the node, an association between two nodes, a table, and/or a web service. The application can include functions from a software development kit including predefined application functions. The code development system can include at least one processor and at least one memory.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
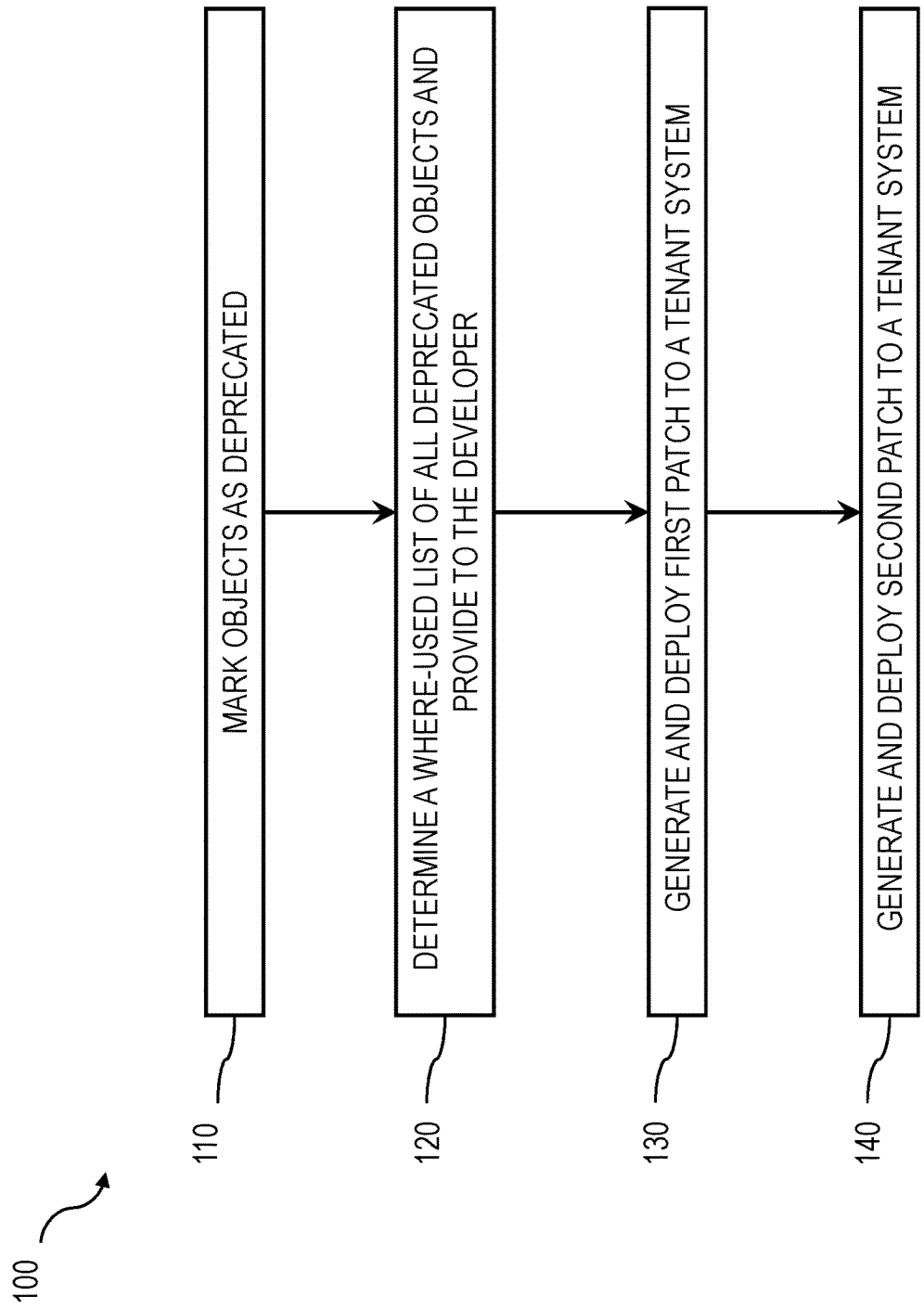
FIG. 1 is a process flow diagram illustrating an example process of a two-step patch approach for deleting delivered objects.

In some multitenant systems, Partner Development Infrastructure (PDI) can be provided to enhance a cloud solution (e.g., application) of a tenant by enabling creation of PDI solutions that contain developed and enhanced objects. Such objects can be visible system-wide. A PDI can include a software development kit (SDK) and defined objects (e.g., for use with the SDK) providing tools (e.g., application functions) from which partners (e.g., tenants) can create custom solutions for enhancing their database systems. A tenant can extend the objects included with the PDI as part of their customization. Extending object can include adding onto the objects, such as adding additional fields. Multitenant systems can include multi-cloud systems including multitenant database systems that can be provided by one or more different providers.

But in systems which preserve data by preventing deletion of delivered (e.g., deployed) objects from the system or portions of objects from the system, unused objects cannot be removed, resulting in solutions (e.g., applications) including unnecessary objects. Such solutions (e.g., applications) can be unnecessarily large; require additional time to activate, assemble, and deploy; and require additional system resources to manage. Further, because an object can only be extended (e.g., added onto), object names cannot be changed nor can a status of the object be set to deprecated, further complicating developer management of objects.

In some implementations, the current subject matter relates to a two-step patch process for enabling deletion of unused objects within a database application that can reduce system overhead and improve application (e.g., PDI solution) performance. The two-step process can include, in the first step, marking objects as deprecated and determining a where-used list for removal of object usage from the application via a first patch. The first patch can include developer changes removing usage of the object and further can prevent new usage of the object by tenants of a multitenant database system. The first patch can be generated and deployed to each tenant in the multitenant database system thereby preventing any additional usage. In the second step, a second patch can be generated that allows for (e.g., enables) the removal of the object. The object can be removed (e.g., deleted), for example, after the second patch and by a tenant. By removing delivered objects according to the two-step patch approach, some implementations of the current subject matter can enable removal of unnecessary objects or portions of objects while also insuring against removal of objects that may still be utilized by another tenant.

Objects can include data and processes including a data source, a field within a data source, a node of an object, an element of an object node, an association between two nodes of an object, a table, a web service, and/or the like. An object can be created using any known computing systems and languages such as ABAP. Objects can be created at design-time for execution at runtime of an application. To accommodate design-time creation and runtime execution, objects are deployed at the database system.

As noted above, some database systems can prevent deletion of an object or portion of an object. In more detail, to prevent data loss within a multitenant database system, a maintenance mode can be utilized by some systems. Maintenance mode can prevent the deletion of objects or portions of objects as well as the modification of an object in a manner that would result in data loss. For example, maintenance mode can prevent deletion of single elements of an object node; prevent changing of a data type definition of an element (e.g., reduce the length of the data type (for example from char 80 to char 50), reduce the scope of the date type (for example from DateTime to Date or from characters to digits), change a data type so no conversion can be run thus deleting the data, and the like); deletion of whole nodes of an object; deletion of whole objects, delete fields from a data source; change or delete transformation of a data source; delete a whole data source; and the like.

During the natural life cycle of an application, patching may be required to update and/or fix an application. Such patching may involve deletion of objects or portions of objects as well as the modification of an object in a manner that would result in data loss. In systems in which such deletion or modification is prevented, extension of the object is allowed enabling updates to create new and/or larger objects as needed. But while objects or portions thereof may become unused as a result of patching the application, the unused object or portions thereof remains a part of the application and therefore requires time for activation, assembly, and deployment. Further, such objects are not hidden from developers, thereby complicating object management.

Some implementations of the current subject matter relates to a two-step patch approach for deleting delivered objects. Such an approach can prevent data loss and/or any other inconsistency within an application of a database system. A two-step patch approach can be implemented because most objects are not tenant-aware and a PDI solution can be deployed into several tenants of the same system. Thus, any deletion of an object in one tenant can be effective in all tenants. Accordingly, the two step patch approach first prevents and removes usage of the object, then enables deletion and/or removal of the object.

FIG. 1 is a process flow diagram illustrating an example process 100 of a two-step patch approach for deleting delivered objects. At 110, objects are marked as deprecated. A developer at design time can mark an object as deprecated, which can include annotating the code that defines the object. For example, ABAP code defining an object can be annotated to mark the object as deprecated.

At 120, a where-used list of all deprecated entities can be determined and shown to the developer. The where-used list can be determined, for example, by analyzing the source code of the application in order to identify any usage of the object. The where-used list may be determined, for example, by analyzing code provided by the developer for modification of the application. Such analysis can be performed by identifying or scanning portions of code declaring objects to determine whether the code declares the object. When the code declares an object, that occurrence and a location can be added to the where-used list. The where-used list can be provided to the developer, who can remove those usages from the application source code.

At 130, the first patch can be generated and deployed to a tenant system. The first patch can include the where-used list, code from the developer for modifying the solution (e.g., application) so as to remove usage of the object, and the first patch can require that no new usages of these deprecated entities are allowed. For example, the first patch, when deployed, can configured the tenant system to disable a tenant from building a new custom solution utilizing the object. By including the where-used list within the assembly (e.g., the deployed solution), a developer can later have access to such where-used list for further development and/or modification of the PDI solution.

In some implementations, after the deployment of the first patch, which still contains the deprecated object(s), the first patch can be thoroughly tested by the partner to ensure that the non-usage of the deprecated objects do not break the solution/functionality being patched. In some implementations, testing can be required by the partner before the second patch is generated.

At 140, the second patch can be generated and deployed to a tenant system. The second patch, also referred to as a deletion patch, can configure the tenant system to allow the tenant to delete all objects that are marked as deprecated and not part of the assembled where-used list. In order to avoid unintended deletion of data, the second patch can allow (e.g., enable) the deletion of delivered objects by only special users like an administrator and based on special authorizations. In addition, a dedicated agreement may be required to be signed, similar to a deployment or production fix agreement. In some implementations, the code development system and the deployment system can be configured such that only such a deletion patch is allowed to override a maintenance mode and delete objects.

Figure 2:
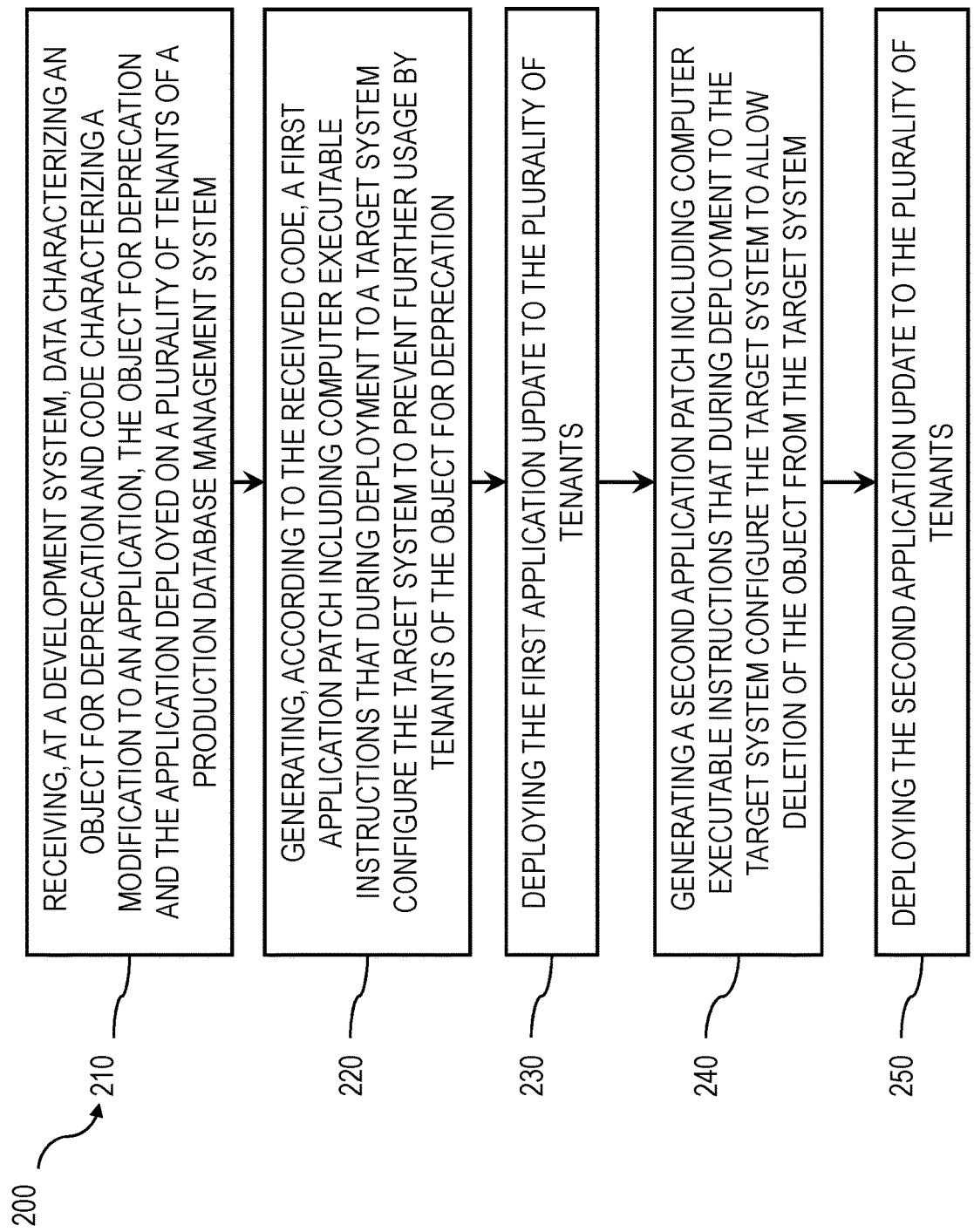
FIG. 2 is a process flow diagram illustrating another example process for enabling deletion of delivered objects within a multitenant database system that can enable removal of unnecessary objects or portions of objects and thereby improve database performance.

FIG. 2 is a process flow diagram illustrating another example process 200 for enabling deletion of delivered objects within a multitenant database system that can enable removal of unnecessary objects or portions of objects and thereby improve database performance. The multitenant database system can include a multi-cloud system, which can include the use of multiple cloud computing and storage services in a single heterogeneous architecture. Such an approach can include distributing cloud assets, software, applications, and the like. across several cloud-hosting environments. With a multicloud architecture utilizing two or more clouds, a multicloud environment can eliminate reliance on any single cloud provider.

For example, an enterprise may concurrently use separate cloud providers for infrastructure (IaaS) and software (SaaS) services, or use multiple infrastructure (IaaS) providers. In the latter case, they can use different infrastructure providers for different workloads, deploy a single workload load balanced across multiple providers (active-active), or deploy a single workload on one provider, with a backup on another (active-passive).

At 210, data characterizing an object for deprecation and code characterizing a modification to an application can be received. The data and the code can be received at a code development system, for example, associated with a database management provider. The object can be deployed on a plurality of tenants of the database management system, which are utilized by developers. The database management system can be a production system, in that it can it available to users of the system, and as distinguished from development or test systems. The multitenant database system can include system level processing and persistence. The multitenant database system can include multiple tenants including the first tenant. For example, the multitenant database system can include distributed database systems, enterprise resource planning ("ERP") systems, and customer relationship management ("CRM") systems. A tenant can include a group of users who share a common access with specific privileges to the software instance of the system. With a multitenant architecture, a software application can be designed to provide every tenant a dedicated share of the instance, including its data, configuration, user management, tenant individual functionality and non-functional properties.

The object can include a data source, a field within a data source, a node of an object, an element of an object node, an association between two nodes of an object, a table, a web service, and/or the like.

At 220, a first patch (e.g., first application update) can be generated according to the received code. The first patch can be configured to deploy to a target system and when deployed can configure the target system to prevent further usage by tenants of the object for deprecation. For example, the first patch can modify an application of a tenant database system such that the tenant no longer is able to create or modify applications in a manner that would utilize the object, although existing applications may still utilize the object. The first application patch can include computer executable instructions that that during deployment to a target system configure the target system to prevent further usage by tenants of the object for deprecation.

In some implementations, objects can include a life cycle status that can take on multiple values, such a "released" or "deprecated". The life cycle status can be checked in order to implement prevention of further usage of the object by the tenant. For example, the first patch can modify the life cycle status of an object deployed at the tenant such that the life cycle status is deprecated. Any further attempts to use the object by the tenant can be prevented for any object with the deprecated life cycle status. The modification of life cycle status can be applied from the solution (e.g., PDI).

In some implementations, generating the first patch can include assembling the patch. Assembly of the patch can include activating all objects in the first patch, checking all objects in the patch, and, if no errors are identified, the definitions of all objects can be collected into a compressed file and downloaded to the code development system.

At 230, the first patch (e.g., first application update) can be deployed to the tenants. The patch can modify an application within each tenant database system such that the tenant no longer is able to create or modify applications in a manner that would utilize the object. By preventing further new utilizations of the object, the first patch can insure against unidentified usage of the object, which can aid a developer in insuring all usages of the object have been removed from any and all applications. Deploying can include determining if the tenant is allowed to upload a file including definitions of the objects, performing additional validity checks (e.g., release versions must match), if no errors are identified, then the file including definitions of the objects can be uploaded to the system database. The system database can unpack the object definitions and determine whether any objects or a portion of an object are deleted. A user can be prompted to sign an agreement related to the upload (e.g., acknowledging that a patch may change behavior of the application), after which the patch can be activated. It should be appreciated that the patch can be deployed to one, some and/or all tenants within the multitenant database system.

At 240, a second patch (e.g., second application update, deletion patch) can be generated. The second patch can be configured to deploy to the target system and configure the target system to allow deletion and/or removal of the object from the target system. For example, the second patch can modify an application of a tenant database system such that the tenant can delete and/or remove the object. The second application patch can include computer executable instructions that during deployment to the target system configure the target system to allow deletion of the object from the target system. In some implementations, an object can be deleted if the object status is "deprecated" and the where-used list, which was previously deployed in the first patch, for the object is empty. In some implementations, if these conditions are satisfied, maintenance mode checks for the object can be disabled.

At 250, the second patch can be deployed to the plurality of tenants. The patch can modify the application within each tenant database system such that the tenant is able to delete and/or remove the object. As part of the removal process, additional steps may be required of the tenant. For example, deletion of delivered objects can be enabled only for special users like an administrator having special authorizations. Similarly, a dedicated agreement between tenant and database management system provider addressing the removal of delivered objects. In some implementations, whether in a development or deployment setting, the multitenant database system can be configured such that only a deletion patch (e.g., the second patch) is allowed to override checks of a maintenance mode element and enable objects to be deleted.

Figure 3:
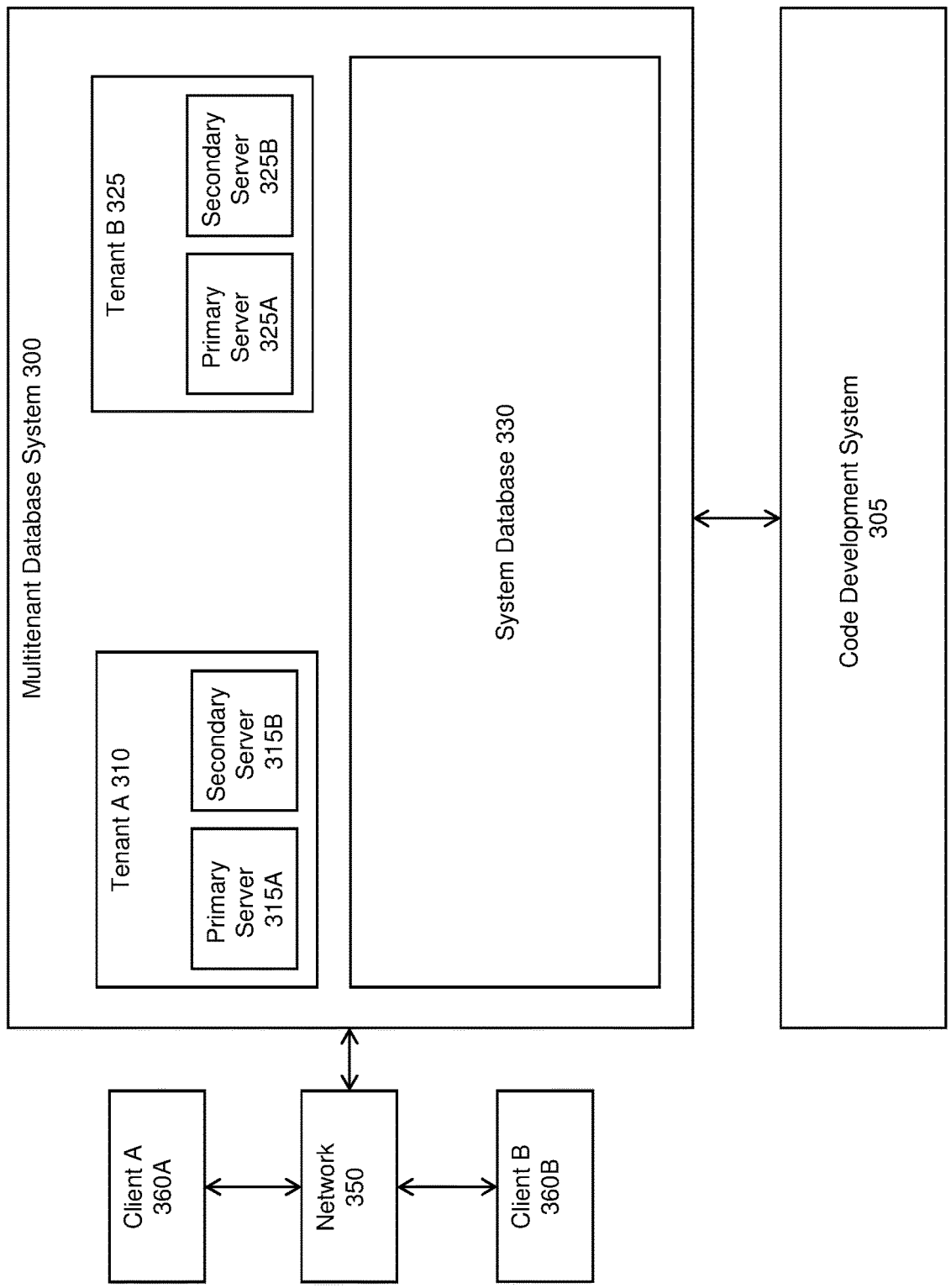
FIG. 3 depicts a system diagram illustrating a multitenant database system.

FIG. 3 depicts a system diagram illustrating a multitenant database system 300 for enabling deletion of delivered objects. Referring to FIG. 3, the multitenant database 300 may include a plurality of tenant databases including, for example, a first tenant database 310 and a second tenant database 320. The multitenant database 300 may further include a system database 330 configured to orchestrate deployment of and support of PDI solutions to tenants within the multitenant database 300. Objects, when deployed, can reside within the system database 330 and the application (e.g., PDI solution) can reside on one or more of the tenant systems 310, 320. Accordingly, the system database 330 can include the objects after deployment and the tenant databases 310, 320 can include the solution (e.g., application). It should be appreciated that a given solution and/or object can be deployed to some but not all tenant databases within the multitenant database system 300.

Each tenant database in a multitenant database system may run its own instances of a primary server and a secondary server, which may be executables from a kernel of the multitenant database system. To further illustrate, as shown in FIG. 3, the first tenant database 310 may include a first primary server 315A and a first secondary server 315B. The first primary server 315A and the first secondary server 315B may be running instances of executables from the kernel of the multitenant database system 300. Meanwhile, the second tenant database 320 may include a second primary server 325A and a second secondary server 325B. The second primary server 325A and the second secondary server 325B may also be running instances of executables from the kernel of the multitenant database system 300. It should be appreciated that each tenant database may be associated with more than one instance of a primary server and/or secondary server. Where a tenant database includes multiple primary servers, at least one the primary servers may be designated as a master primary server. The master primary server can coordinate with the system database 330 for deploying new or modified objects and/or applications within a multitenant database system.

The multitenant database system 300 can interface with a code development system 305 for the development, testing, and deployment of custom solutions (e.g., PDI solutions) and associated objects. To effectuate the two step patch deletion of already delivered objects, the code development system 305 can receive from a developer, an indication marking an object previously delivered (e.g., in use, at run-time, in production, and the like) for deprecation. The marking of the object can include, for example, annotating code defining the object.

The development and test system 305 can determine a where-used list, which can indicate where within a PDI solution (e.g., application) the object is being utilized. The determination can include, for example, scanning the source code of the PDI solution to determine whether the object is subject to a declare statement. The where-used list can be presented, via a graphical user interface, to the developer to enable the developer to create code for a first patch of the application. The developer can create and provide code for modifying the application to remove any usage of the object by the PDI solution (e.g., application).

The development and test system 305 can generate a first patch of the PDI solution. The first patch can include the code provided by the developer, the where-used list, and can configure a target system (e.g., the multitenant database system, tenants within the multitenant database system, and the like) to prevent any new usage of the object that has been marked for deprecation.

The system database 330 can orchestrate deployment of the first patch within the multitenant database system 300. For example, the first patch, when deployed, can configure the first tenant system 310 and second tenant system 325 to disable a user from building a new custom solution utilizing the object. In some implementations, the definition of the depreciable objects are placed into the system database 330.

The development and test system 305 can generate a second patch and system database 330 can orchestrate deployment of the second patch. The second patch, also referred to as a deletion patch, can configure the first tenant system 310 and second tenant system 325 to allow a respective user (e.g., administrator) to delete all objects that are marked as deprecated and not part of the assembled where-used list. In order to avoid unintended deletion of data, the second patch can allow (e.g., enable) the deletion of delivered objects by only special users like an administrator and based on special authorizations. In addition, a dedicated agreement may be required to be signed, similar to a deployment or production fix agreement. In some implementations, only such a deletion patch is allowed to override a maintenance mode and delete objects.

The multitenant database system 300 may operate utilizing deployed objects. For instance, the tenant database 310 may access the objects located within primary server 315A and/or system database 330, in response to a database query that requires running one or more application functions (e.g., PDI functions). To further illustrate, the first tenant database 310 may receive, from a first client 360A associated with the first tenant database 310 and via network 350, a database query. The first primary server 315A may process the database query including using the objects that are required to execute the database query.

Alternatively and/or additionally, the second tenant database 320 may receive a database query from a second client 360B associated with the second tenant database 320 via network 350. The second primary server 325A may process this database query including using the objects that are required to execute the database query.

Figure 4:
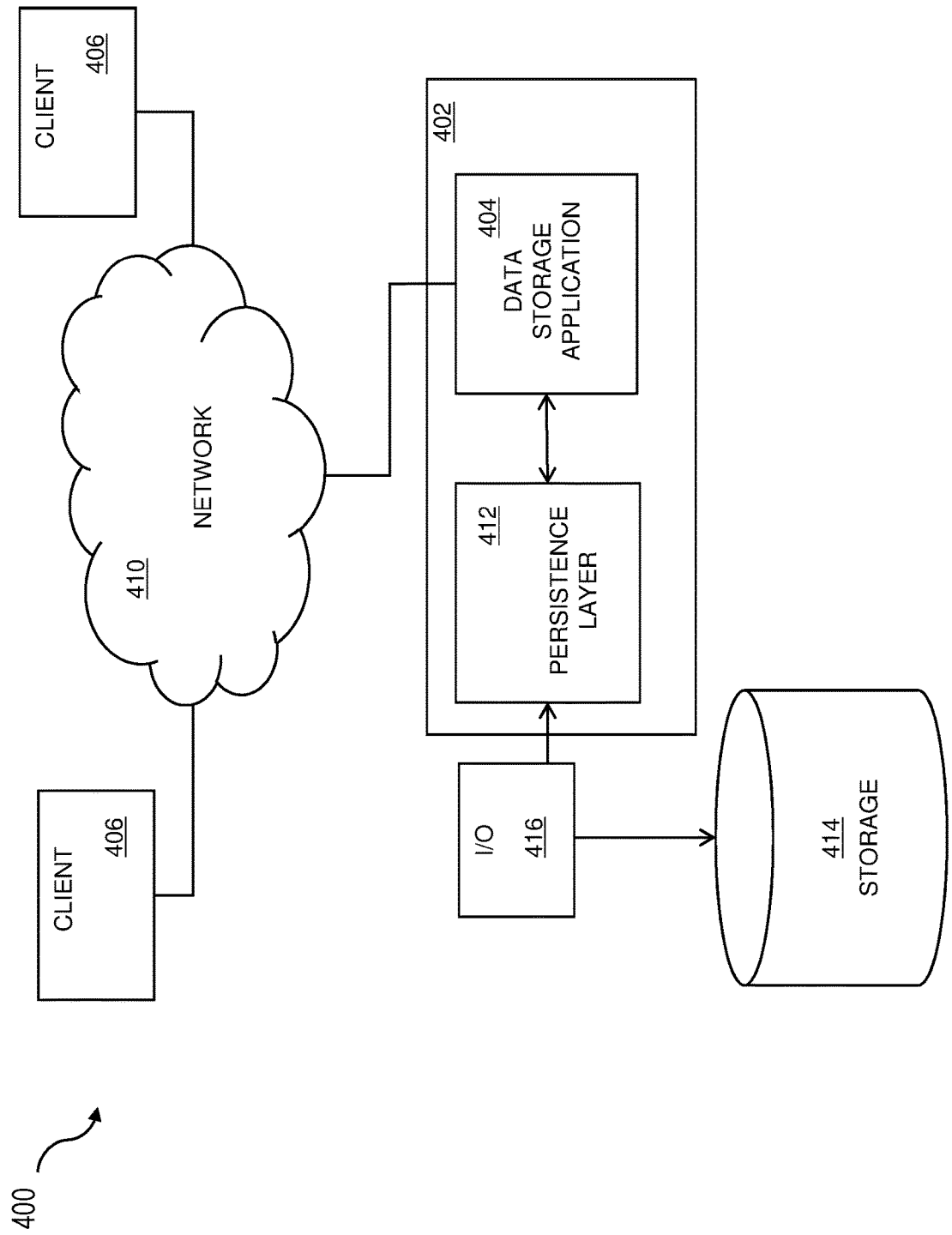
FIG. 4 illustrates an exemplary system according to an example implementation of the current subject matter.

FIG. 4 illustrates an exemplary system 400 in which a computing system 402, which can include one or more programmable processors that can be collocated, linked over one or more networks, and the like, executes one or more modules, software components, or the like of a data storage application 404, according to some implementations of the current subject matter. The data storage application 404 can include one or more of a database, an enterprise resource program, a distributed storage system, or the like.

The one or more modules, software components, or the like can be accessible to local users of the computing system 402 as well as to remote users accessing the computing system 402 from one or more client machines 406 over a network connection 410. One or more user interface screens produced by the one or more first modules can be displayed to a user, either via a local display or via a display associated with one of the client machines 406. Data units of the data storage application 404 can be transiently stored in a persistence layer 412 (e.g., a page buffer or other type of temporary persistency layer), which can write the data, in the form of storage pages, to one or more storages 414, for example via an input/output component 416. The one or more storages 414 can include one or more physical storage media or devices (e.g. hard disk drives, persistent flash memory, random access memory, optical media, magnetic media, and the like) configured for writing data for longer term storage. It should be noted that the storage 414 and the input/output component 416 can be included in the computing system 402 despite their being shown as external to the computing system 402 in FIG. 4.

Data retained at the longer term storage 414 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Without in any way limiting the scope, interpretation, or application of the claims appearing below, a technical effect of one or more of the example implementations disclosed herein may include one or more of the following, for example, by removing delivered objects according to the two-step patch approach, some implementations of the current subject matter can enable removal of unnecessary objects or portions of objects while also insuring against removal of objects that may still be utilized by another tenant. The current subject matter can enable removal of unused objects that otherwise may not be removed, thereby removing unnecessary objects. As compared to some conventional systems, the current subject matter can enable solutions that may be smaller; require less time to activate, assemble, and deploy; and require fewer system resources to manage. Further, the current subject matter can enable changing object names and status of the object. The current subject matter can improve developer management of objects. The current subject matter can reduce total cost of ownership including improving management of objects, reducing resource consumption, and the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving, at a code development system, data characterizing an object for deprecation and code characterizing a modification to an application, the object for deprecation and the application deployed on a plurality of tenants of a production database management system;
generating, according to the received code, a first application patch including computer executable instructions that during deployment to a target system configure the target system to prevent further usage by tenants of the object for deprecation while the application is configured to continue utilization of the object, the target system including one or more tenants of the plurality of tenants, wherein the usage of the object is prevented based on at least a lifecycle status of the object;
deploying the first application patch to the plurality of tenants;
generating a second application patch including computer executable instructions that during deployment to the target system configure the target system to allow deletion of the object from the target system; and
deploying the second application patch to the plurality of tenants.

2. The method of claim 1, further comprising:
determining whether the object for deprecation is utilized by the application.

3. The method of claim 2, further comprising:
generating a list indicating locations within the application that the object for deprecation is utilized, wherein the first application patch includes the list indicating locations within the application that the object for deprecation is utilized.

4. The method of claim 2, further comprising:
presenting, to a user, a visualization characterizing the determination.

5. The method of claim 1, further comprising:
preventing, by at least one tenant of the multitenant database system, utilization of the object.

6. The method of claim 1, further comprising:
deleting, by at least one tenant of the multitenant database system, the object from the multitenant database system.

7. The method of claim 1, wherein the object includes a data source, a field within the data source, a node, an element of the node, an association between two nodes, a table, or a web service.

8. The method of claim 1, wherein the application includes functions from a software development kit including predefined application functions.

9. The method of claim 1, wherein the code development system includes at least one processor and at least one memory.

10. A system comprising:
at least one processor;
memory storing instructions which, when executed by the at least one processor, causes the at least one processor to perform operations comprising:
receiving data characterizing an object for deprecation and code characterizing a modification to an application, the object for deprecation and the application deployed on a plurality of tenants of a production database management system;
generating, according to the received code, a first application patch including computer executable instructions that during deployment to a target system configure the target system to prevent further usage by tenants of the object for deprecation while the application is configured to continue utilization of the object, the target system including one or more tenants of the plurality of tenants, wherein the usage of the object is prevented based on at least a lifecycle status of the object;
deploying the first application patch to the plurality of tenants;
generating a second application patch including computer executable instructions that during deployment to the target system configure the target system to allow deletion of the object from the target system; and
deploying the second application patch to the plurality of tenants.

11. The system of claim 10, the operations further comprising:
determining whether the object for deprecation is utilized by the application.

12. The system of claim 11, the operations further comprising:
generating a list indicating locations within the application that the object for deprecation is utilized, wherein the first application patch includes the list indicating locations within the application that the object for deprecation is utilized.

13. The system of claim 11, the operations further comprising:
presenting, to a user, a visualization characterizing the determination.

14. The system of claim 10, the operations further comprising:
preventing, by at least one tenant of the multitenant database system, utilization of the object.

15. The system of claim 10, the operations further comprising:
deleting, by at least one tenant of the multitenant database system, the object from the multitenant database system.

16. The system of claim 10, wherein the object includes a data source, a field within the data source, a node, an element of the node, an association between two nodes, a table, or a web service.

17. The system of claim 10, wherein the application includes functions from a software development kit including predefined application functions.

18. A non-transitory computer readable medium storing instructions, which when executed by at least one processor of at least one computing system, implement operations comprising:
receiving, at a code development system, data characterizing an object for deprecation and code characterizing a modification to an application, the object for deprecation and the application deployed on a plurality of tenants of a production database management system;
generating, according to the received code, a first application patch including computer executable instructions that during deployment to a target system configure the target system to prevent further usage by tenants of the object for deprecation while the application is configured to continue utilization of the object, the target system including one or more tenants of the plurality of tenants, wherein the usage of the object is prevented based on at least a lifecycle status of the object;
deploying the first application patch to the plurality of tenants;
generating a second application patch including computer executable instructions that during deployment to the target system configure the target system to allow deletion of the object from the target system; and
deploying the second application patch to the plurality of tenants.

19. The computer readable medium of claim 18, the operations further comprising:
determining whether the object for deprecation is utilized by the application.

20. The computer readable medium of claim 19, the operations further comprising:
generating a list indicating locations within the application that the object for deprecation is utilized, wherein the first application patch includes the list indicating locations within the application that the object for deprecation is utilized.

* * * * *